United States Patent [19]

Havermans

[11] Patent Number: 4,486,878
[45] Date of Patent: Dec. 4, 1984

[54] DIGITAL TELEPHONE EXCHANGE WITH MEANS FOR PROCESSING PACKET-SWITCHED DATA

[75] Inventor: Gerardus M. J. Havermans, Eindhoven, Netherlands

[73] Assignee: U.S. Philips Corporation, New York, N.Y.

[21] Appl. No.: 408,339

[22] Filed: Aug. 16, 1982

[30] Foreign Application Priority Data

Sep. 23, 1981 [NL] Netherlands .................. 8104368

[51] Int. Cl.$^3$ .................................................. H04J 3/02
[52] U.S. Cl. .................................... 370/60; 370/94
[58] Field of Search .................... 370/58, 60, 94, 110.1

[56] References Cited

U.S. PATENT DOCUMENTS

| | | | |
|---|---|---|---|
| 4,392,222 | 7/1983 | Ando | 370/60 |
| 4,408,323 | 10/1983 | Montgomery | 370/60 |
| 4,413,337 | 11/1983 | Dauphin et al. | 370/94 |

FOREIGN PATENT DOCUMENTS 57-7656  1/1982  Japan ................................. 370/60

OTHER PUBLICATIONS

*IEEE Transactions on Communications,* vol. COM-24, No. 10, pp. 1089-1100, Oct. 1976, C. J. Jenny & K. Kummerle, "Distributed Processing Within An Integrated Circuit/Packet-Switching Node".
*Naecon 1981, Proceedings of the IEEE* 1981, National Aerospace & Electronics Conference, Dayton, OH, USA (19-21 May 1981), M. J. Ross, K. A. Garrigus, "A Distributed Processing Architecture For Voice/Data Switching".
*ICC '80 1980 International Conference on Communications,* Seattle, WA., USA (8-12 Jun. 1980), M. J. Ross, J. H. Gottshalck & E. A. Harrington, "An Architecture for a Flexible Integrated Voice/Data Switch".
*Computer Design,* vol. 15, No. 6, pp. 83-88, Jun. 1976, J de Smet & R. W. Sanders, "Pacuit Switching Combines Two Techniques in One Network".

*Primary Examiner*—Douglas W. Olms
*Assistant Examiner*—Kenneth I. Rokoff
*Attorney, Agent, or Firm*—Thomas A. Briody; William J. Streeter

[57] ABSTRACT

Digital telephone exchange comprising a plurality of peripheral control domains PCD which are either connected to a digital trunk network DTN or are directly interconnected. Each domain comprises several digital subscriber interface units DSI, a group of digital subscriber sets SS being connected to each interface unit.

The transmission of information over the subscriber line is effected in a b-channel for speech (64 kb/s) a b'-channel for circuit-switched data (0/8/64 kb/s) and a Δ-channel for packet-switched data (8/16 kb/s).

The subscriber line interface circuits SLIC comprise means (166) for identifying the packet-switched data signals and to apply them to a packet processing unit PPU. In this unit the packets are distinguished as firstly signalling information (s) and secondly telemetry and slow data (t+d'). The separately applied signalling information (s) and telemetry data and slow data (t+d') intended for a subscriber line are combined by the packet processing unit to form one packet-switched data signal (Δ) for the subscriber line. In a data unit connected to the trunk network the signals S and (t+d') combined into messages are exchanged between the subscribers without loading the central control unit (CCU) of the telephone exchange.

4 Claims, 2 Drawing Figures

4,486,878

DIGITAL TELEPHONE EXCHANGE WITH MEANS FOR PROCESSING PACKET-SWITCHED DATA

BACKGROUND OF THE INVENTION

The invention relates to a digital telephone exchange comprising a plurality of domains each incorporating subscriber line interface circuits, each serving to connect a subscriber line over which digitized speech signals and data signals are transmitted from and to a digital subscriber set, which data signals are both circuit-switched data signals and packet-switched data signals, these last-mentioned data signals comprising signalling information, telemetry data and slow data, and, to connect a time-division multiplex line over which several signals are transmitted from and to the subscriber lines in time-division multiplex, further comprising a time switching network having terminals for several groups of subscriber lines, terminals for auxiliary units for the signalling information and terminals for a domain interface unit for connection to other domains.

For digital telephone exchanges of the above-described type there is the need to convey, in addition to speech signals, circuit-switched data and packet-switched data from and to the subscriber sets. In practice the following provisions are, for example, taken:

1. a 64 kb/s. b-channel for speech,
2. a 0/8/64 kb/s, b'-channel for circuit-switched data, and
3. a 8/16 kb/s delta channel (Δ-channel) for packet-switched data.

The signalling from and to the subscriber sets is usually incorporated in the Δ-channel.

In practice there is also a need for the transmission of telemetry data such as alarm systems for the elderly, meter reading and remote control and slow data for, for example, Teletext and Videotex. It has already been proposed to incorporate these facilities in the Δ channel. The problem is then encountered that telemetry data and slow data have either a high call rate and a short hold period or a low call rate with a very long hold period. Both types of traffic may give rise to congestion in the telephone exchange.

SUMMARY OF THE INVENTION

The invention has for its object to provide a novel concept for a digital telephone exchange to accommodate the telemetry data and the slow data in the Δ-channel without resulting in congestion in the exchange.

According to the invention, the digital telephone exchange employs a subscriber line interface circuit which comprises means for identifying the packet-switched data signals obtained from the subscriber lines and for applying the packet-switched data signals to a packet processing unit. The packet processing unit includes means for dividing the packets firstly into signalling information and secondly into telemetry data and slow data. Means are provided for combining per subscriber line the signalling information and telemetry data and slow data received from the time-division multiplex line to form one packet-switched data signal, and for transmitting the signalling information from and to a first fixedly assigned channel of the time-division multiplex line of the relevant group of subscriber lines. Means are provided for transmitting the telemetry data and the slow data from and to a second fixedly assigned channel of the said time-division multiplex line, the first fixedly assigned channels being connected semi-permanently to a central signal processing unit of the digital telephone exchange, and the second fixedly assigned channels being semi-permanently through-connected to a packet-switched data unit.

The invention will now be further explained by way of example with reference to a block-schematic circuit diagram of a digital telephone exchange using an embodiment of the invention, with reference to the accompanying Figures.

DESCRIPTION OF THE PREFERRED EMBODIMENT

Figure 1:
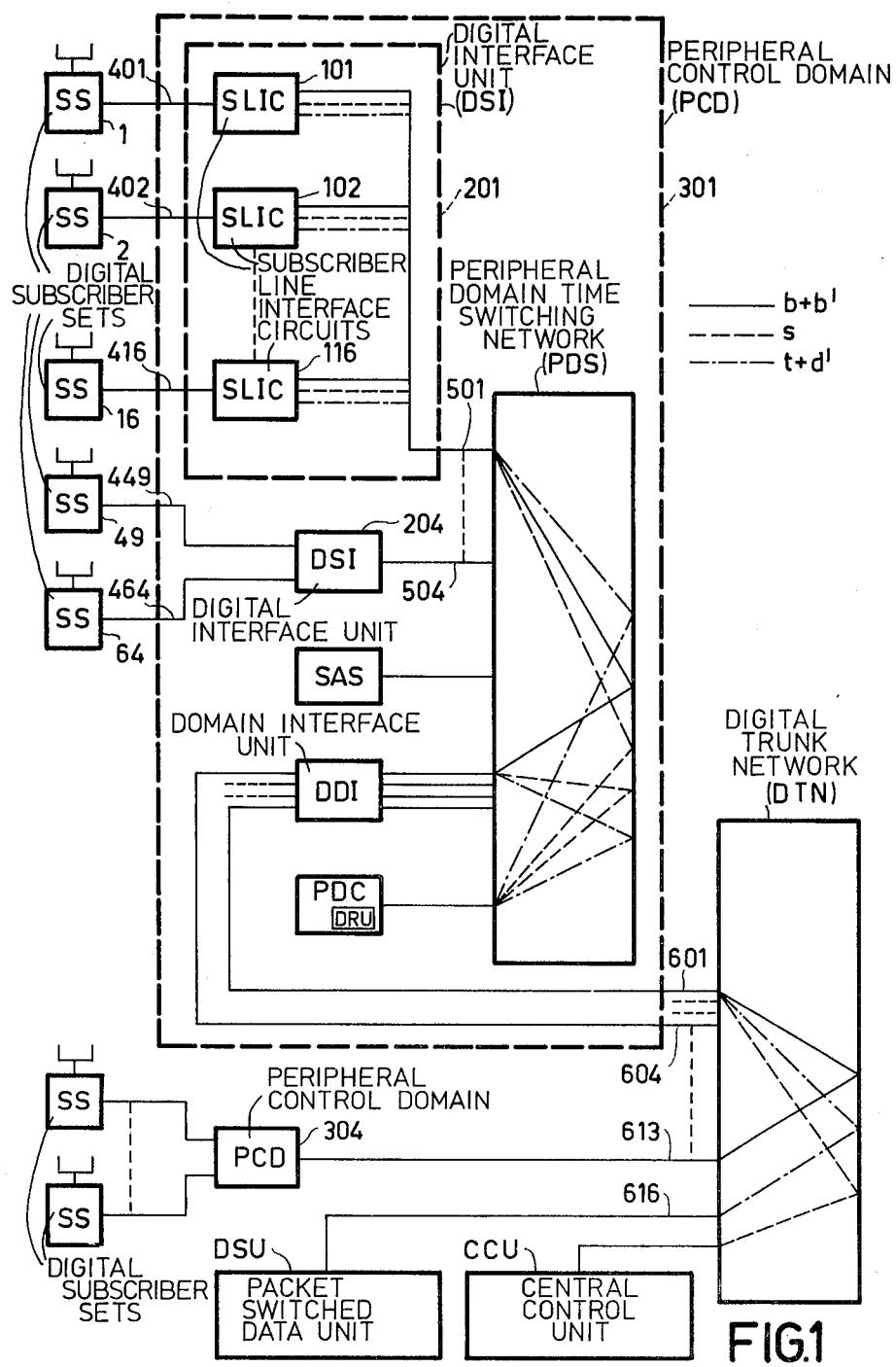
FIG. 1 is a block schematic circuit diagram of a digital telephone exchange using the invention.

The digital telephone exchange to which the invention relates comprises a plurality of peripheral control domains (PCD) of which, the domains 301 and 304 are connected to a digital trunk network (DTN) as shown in FIG. 1.

In this Figure the domain 301 is shown in greater detail. Digital subscriber sets (SS) are connected to this domain. The subscriber sets are divided into groups and each group is connected to a digital subscriber interface unit (DSI). The two groups of subscriber sets 1, 2 ... 16 and 49 ... 64, which are connected to the respective interface units 201 and 204 by means of the subscriber lines 401, 402, ... 416 and 449 ... 464 are shown in the Figure. In the interface units the subscriber lines terminate on subscriber line interface circuits (SLIC's). In the interface unit 201 they are the SLIC's 101, 102, ... 116.

The interface units (DSI) of each individual domain (PCD) are connected to a peripheral domain time switching network (PDS) via multiplex main paths. Thus, in the Figure the interface units 201 and 204 are connected to the time switching network (PDS) via the multiplex main paths 501 and 504.

In addition, a signaling auxiliary unit (SAS), a peripheral domain controller (PDC) and a digital domain interface (DDI) are connected to the time switching network (PDS) via one or more multiplex main paths. The domain interface units (DDI) serve as connections to other domains (PCD).

The interface units (DDI) of different domains (PCD) are connected to the digital trunk network (DTN) via multiplex main paths. In the Figure, the interface unit (DDI) of the domain 301 is connected to the digital trunk network (DTN) via the multiplex main paths 601 to 604, inclusive. For the domain 304 this connection is effected via main paths such as 613.

A central control unit (CCU) which serves inter alia as a central signal processing unit for the signalling is connected to the digital trunk network (DTN).

For smaller exchanges the domain interface units (DDI's) may be interconnected directly and connected directly to the central control unit (CCU).

The digital speech signal transmission from subscriber sets (SS) to the exchange and vice versa is effected at a standardized transmission rate of 64 kb/s. in PCM form in a b-channel of the subscriber lines.

The multiplex main paths such as 501 ... 504 comprise, for example, thirty-two 64 kb channels and consequently have a processing speed of 2.048 kb/sec., designated 2 Mb/sec, in the further course of the description.

In addition to speech signals, circuit-switched data streams may be transmitted from the subscriber sets to the exchange and vice versa. This transmission is effected at a standardized transmission rate of 0/8/64 kb/sec. in a subscriber line b' channel allocated thereto.

For packet-switched data use is made on a subscriber line of a delta channel ($\Delta$) with a standardized transmission rate of 8/64 kb/s.

Inter alia the telephony signalling signals(s) are accommodated in this $\Delta$-channel. For other forms of data such as telemetry data (t) and "slow" data (d) such as Teletext and Viewdata, they may also be accommodated in the $\Delta$-channel. The peripheral domain controller (PDC) and further interface equipment are then heavily loaded by the slow data traffic, which has a high call rate and a very short holding period or a low call rate and a very long holding period compared with the normal telephone traffic. This may cause congestion for normal telephone traffic.

Figure 2:
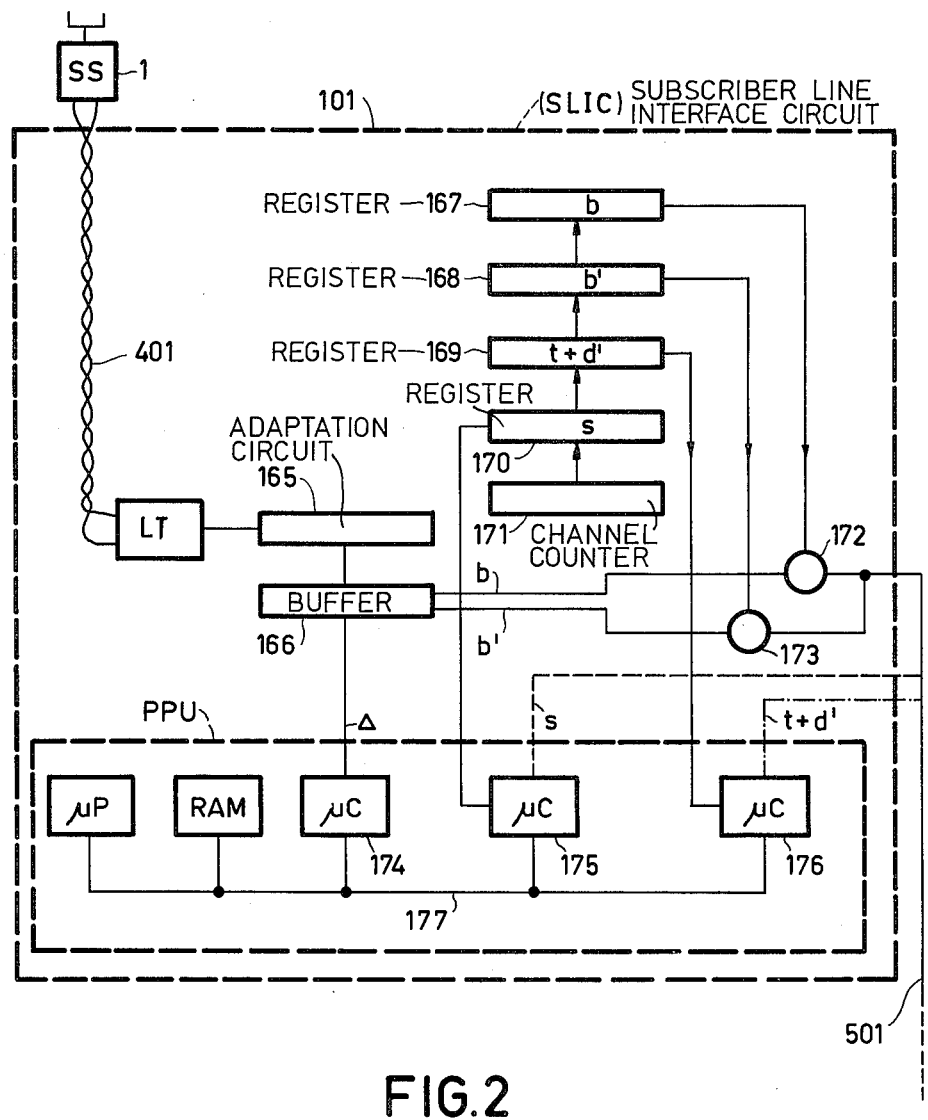
FIG. 2 shows an embodiment of a subscriber line interface circuit for use in the exchange shown in FIG. 1.

To obviate this the subscriber line interface circuit (SLIC) is, in accordance with the invention, of a construction as shown in FIG. 2 and a packet-switched data unit (DSU) is connected to the digital trunk network (DIN). In addition, a data reduction unit (DRU) may be incorporated in the peripheral domain controller (PDC) in order to limit the data traffic to the data unit (DSU) as much as possible.

The subscriber line interface circuit shown in FIG. 2 comprises in customary manner a line transmission circuit (LT) connected to the subscriber line 401, this line transmission circuit providing the transmission facility for the two-way channels b, b' and $\Delta$.

An adaptation circuit 165 is arranged for adapting the speed between the channels on the telephone line 401 and the exchange.

The transmission over the subscriber line is effected in frames in which bits for the channels b, b' and $\Delta$ are transmitted in groups.

Complete frames are exchanged between the adaptation circuit 165 and a buffer 166. The information from the $\Delta$-channel of an incoming frame is identified in the buffer 166 and applied to a packet processing unit (PPU) which comprises means to divide the packets firstly into signalling information (s) and secondly into telemetry data and slow data (d+t). The unit (PPU) also comprises means for combining per subscriber line the signalling information(s) obtained from the time-division multiplex line (main line 501) and telemetry and slow data (t+d) into one packet-switched data signal and for the transmission of the signalling information (s) from and to a first fixedly assigned channel of the time-division multiplex line (main line 501) of the relevant group of subscriber lines and for the transmission of the telemetry data and the slow data from and to a second fixedly assigned channel of the said time-division multiplex line (main line 501).

More particularly, the packet processing unit (PPU) comprises a $\mu$-Processor ($\mu$P), for example a Z-8000, a random access memory (RAM) and the $\mu$-controllers ($\mu$C's), 174, 175 and 176, for example a Signetics 2652, mutually interconnected by a bus 177.

The information obtained from the $\Delta$-channel is split in the $\mu$-controller 174 into signalling information (s) and telemetry data and slow data (t+d') and stored per type of information (s) or (t+d') in the store (RAM). When the total information of a signalling message(s) has been stored in the store (RAM) the $\mu$-controller 175 investigates whether a special signalling channel (s), denoted the first channel, on the main path 501 is free, which channel is represented in the Figures by a broken line. The appearance of the signalling channel (s) on the main path 501 is reported to the $\mu$-controller 175 by a register 170, in which the channel number of the signalling channel (s) is stored. A time-channel counter 171 which counts the channels in a frame which appear on the main path 501 is connected to the register 170. If there is agreement between the channel number in the time-channel counter 171 and the channel number in the register 170, and this signalling channel is free, the signalling message stored in the memory (RAM) is fed into this 64 sb signalling channel (s) at a rate of 2 Mb/sec by the $\mu$-controller 175. Likewise, the total information of a telemetry message (t) and the total information of the slow data message (d') is stored in the (RAM). When a complete telemetry message (t) or a complete slow data message (d') is present in the memory (RAM) the $\mu$-controller 176 investigates whether a second channel specially assigned to telmetry data and slow data (t+d') is free, which channel is represented in the Figures by a dot-and-dash line. The $\mu$-controller 176 receives the information on the occurrence of the said (t+d') channel from a register 169, which is also connected to the time-channel counter 171. The register 169 operates in a similar manner as register 170. When there is agreement between the channel number in the time-channel counter 171 and the channel number in the register 169, and the (t+d') channel is free, the telemetry data message (t) and the slow data message (d') stored in the memory (RAM) is fed into this 64 kb(t+d') channel at a rate of 2 Mb/sec.

The use of the registers such as 169 and 170 render it possible to realize a flexible allocation of common(s) and (t+d') channels on the main path 501.

By extending the number of registers it is possible to allocate several separate (s) and (t+d') channels in a flexible manner.

The packet processing unit (PPU) is not only arranged for transmitting in separate channels (s) and (t+d') of the main path 501 the signalling information and the telemetry data in combination with the slow data coming from the $\Delta$-channel of the subscriber lines, but this unit is also arranged for assembling the information present in the separate channels(s) and (t+d') of the main path 501 intended for the relevant subscriber set into one packet-switched data signal for transmission in the $\Delta$-channel in the subscriber line 401.

For that purpose the $\mu$-controllers 176 and 175 investigate, at the instants indicated by the registers 169 and 170 of the occurrence of the (t+d') channel and the (s)-channel of the main path 501, whether telemetry data or slow data and signalling information are present for the relevant subscriber. If such information occurs the $\mu$-controller 175 and 176, respectively write this information into the memory (RAM). Under the control of the $\mu$-processor ($\mu$P) this information is assembled in $\mu$-controller 174 to form packets of (s)+(t+d') information. As soon as such a packet has been assembled this packet is fed into the $\Delta$-channel of the subscriber line 401 by the $\mu$-controller 174 via the frame buffer 166, the adaptation circuit 165 and the line transmission circuit (LT). The speech signals (b) and circuit-switched data (b'), respectively, which are separated in the buffer 166 are applied to the respective gate circuits 172 and 173 via the respective separate lines b and b'.

These gate circuits are controlled by registers 167 and 168 which are both connected to the channel counter 170. Random channels of the main path 501 are assigned to the registers; this is shown in the Figures by means of a solid line. At the occurrence of the channel(b) of the outgoing channels on the main path 501 allocated to the speech signals, the gate circuit 172 is open and the speech signal information (b) contained in the frame buffer 166 is applied to this 64 kb channel at a rate of 2 Mb/sec. Likewise, at the occurrence of a channel (b') of the outgoing channels on the main path 501 allocated to the circuit-switched data (b'), the gate circuit 173 is open and the data information (b') contained in the buffer 166 is applied to that channel in a similar manner.

For channels belonging to this group of incoming channels on the main path 501, fixedly adjusted per connection to the relevant subscriber, the gate circuits 172 and 173 are open in a corresponding manner for applying speech signals over the line b and circuit-switched data over the line d' from the main path 501 to the buffer 166 at a rate of 2 Mb/sec. Via the adaptation circuit 165 and the line transmission circuit LT these speech signals and circuit-switched data are applied to the subscriber line 401 at the associated low bit rate.

It should be noted that, instead of connecting it to a gate circuit 173, it is alternatively possible to connect the line b' connected to the buffer 166 to a further $\mu$-controller in the packet processing unit (PPU). It is then possible to put the information in the b'-channel of the subscriber line 401 on the special (s) and (t+d') channels of the main path 501 and vice versa, if so desired.

As shown in FIG. 1, in this embodiment the channels in which (b) and (b') information is present on the main path 501 are switched-through via the peripheral domain time switching network (PDS) to the domain interface unit (DDI) where they are interconnected in a one-by-one configuration to channels of a time division multiplex main path 601 which are connected via the digital trunk network (DTN) and the time-division multiplex main path 613 to the peripheral control domain 304 for directly exchanging speech signals and circuit-switched data between these peripheral control domains 301 and 304.

The special signalling channel (s) and the special telemetry data and low data channel (t+d') are connected in this embodiment, each one individually via the domain time switching network (PDS), to the data reduction unit (DRU) provided in the peripheral domain controller (PDC). This data reduction unit (DRU) is a dynamic multiplexer which concentrates the information present in the special signalling channels (s) of several subscriber interface units (DSI) and applies this concentrated signalling information (s) to the interface unit (DDI) via at least one semi-permanent channel of the time switching network (PDS). From this interface unit (DDI) the concentrated signalling information (s) is applied via at least one special semi-permanent channel in the time-division multiplex main path 601 via the digital trunk network (DTN) to a central signalling processing unit, not shown, in the central control unit CCU of the telephone exchange and processed there. Signalling information (s) which must be applied to a subscriber interface unit (DSI) by the central control unit (CCU) is applied via the digital trunk network (DTN), the main path 601 and the interface unit (DDI) of the peripheral control domain 301 and the peripheral domain time switching network (PDS) to the data reduction unit (DRU) from where this signalling information (s) is distributed. This signalling information (s) is then applied to the relevant main path 501 via the peripheral domain switching network (PDS).

The telemetry data and slow data in the special channels (t+d') obtained from several subscriber interface units (DSI) are also concentrated in the data reduction unit (DRU) and applied to the interface unit (DDI) via at least one semi-permanent channel of the time switching network (PDS). From this interface unit (DDI) the concentrated telemetry data and slow data information (t+d') are applied via at least one special semi-permanent channel in the time-division multiplex main path 601 via the digital trunk network (DTN) to the packet-switched data unit (DSU) as processed there.

Telemetry data information and slow data (t+d') to be applied to a subscriber interface unit (DSI) by the data unit (DSU) are applied via the digital trunk network (DTN), the main path 601 and the interface unit (DDI) of the peripheral domain 301 and the peripheral domain time switching network (PDS) to the data reduction unit (DRU) where this information (t+d') is distributed. Thereafter it is applied to the relevant main path 501 via the peripheral domain switching network (PDS).

As will be apparent from the above description the central control unit (CCU) of the telephone exchange does not have the task of processing packet-switched data such as telemetry data (t) and/or low data (d') but these packet-switched data are processed in a separate packet-switched data exchange. Thus, congestion in the control unit (CCU) due to these data is prevented from occurring.

In addition, the signalling information (s) and telemetry data information and slow data (t+d') are transmitted over separate semi-permanent channels within the telephone exchange. This prevents congestion of speech and signalling information (s) due to telemetry data and slow data (t+d') from occurring during this transmission.

Furthermore, because of the provision of a data reduction unit the number of channels required in the time-division multiplex main paths between the mutually interconnected peripheral domain units (PCD's) and the further equipment for transmitting signalling information (s) and telemetry data and slow data (t+d') is very small.

What is claimed is:

1. A digital telephone exchange for connecting a plurality of digital subscriber sets to a time division multiplex transmission line, said subscriber sets and time division multiplex transmission line transmitting and receiving circuit switched data signals, and packet switched data signals which include signalling information, telemetry data and slow data, comprising:
  a plurality subscriber line interface circuit for connecting each of said plurality of digital subscriber sets to said time division multiplexed transmission line comprising:
  means for identifying the packet switched data signals from said subscriber sets;
  a packet processing unit connected to receive said identified packet switched data, said unit including means for dividing the packet into signalling information, and into telemetry data and slow data;
  means for combining for each subscriber set the signalling information, telemetry data and slow data received from said time division multiplex transmission line to form one packet switched data signal; and means for transmitting telemetry data and slow data to said means for combining from a second assigned channel of said time multiplexed transmission line, and from said processing unit to said second assigned channel of said multiplexed transmission line, and for transmitting said signalling information to said means for combining from a first assigned channel of said time multiplexed transmission line, and from said packet processing unit to said second assigned channel;

said first assigned channel being connected to a central signal processing unit, and said second assigned channel being connected to a packet switched data unit.

2. A digital telephone exchange as claimed in claim 1 further comprising a data reduction unit connected between the second fixedly assigned channels and the packet-switched data unit.

3. The digital telephone exchange of claim 1 wherein said means for transmitting information to and from said assigned channels comprises:

recording means for recording channel numbers;

a time channel counter;

means for comparing the contents of said time channel counter and of said recording means; and means for initiating transmission of said signalling information and telemetry data and slow data between said assigned channels and said subscriber line interface circuit when said means for comparing indicates said time channel counter and recording means have the same contents.

4. The digital telephone exchange of claim 1 further comprising a time switching network connected between said subscriber line interface circuit and said time division multiplex transmission line, said switching network having terminals connected to receive and transmit signals to a signalling auxiliary unit, and to receive and transmit signals to a digital domain interface.

* * * * *